United States Patent [19]

Dorough, Jr.

[11] Patent Number: 5,622,019
[45] Date of Patent: Apr. 22, 1997

[54] SIMULATED GLASS-BLOCK STRUCTURE

[76] Inventor: Joe Dorough, Jr., 2719 Royal La., #401, Irving, Tex. 75063

[21] Appl. No.: 203,432

[22] Filed: Mar. 1, 1994

[51] Int. Cl.⁶ .................. E04C 2/36; E04C 2/54
[52] U.S. Cl. ................ 52/308; 52/314; 52/316; 52/456; 52/793.11; 52/800.14
[58] Field of Search .............. 52/306, 307, 308, 52/314, 316, 456, 793.11, 800.13, 800.14, 800.15, 800.16, 800.17, 800.18; D25/103, 106, 107, 108, 109, 110, 111; 428/141, 156, 167

[56] References Cited

U.S. PATENT DOCUMENTS

| D. 34,843 | 7/1901 | Walsh, Jr. ............ D25/103 |
| 737,707 | 9/1903 | Chance . |
| 2,111,569 | 3/1938 | Mulford ............ 52/308 |
| 2,145,930 | 2/1939 | Herron ............ 52/800.14 |
| 2,168,287 | 8/1939 | Favaron ............ 52/308 |
| 2,173,213 | 9/1939 | Maul . |
| 2,187,329 | 1/1940 | Roney et al. ............ 52/316 |
| 2,242,872 | 5/1941 | Rolph . |
| 2,812,691 | 9/1957 | Boyd . |
| 3,180,780 | 4/1965 | Ritter . |
| 3,252,260 | 5/1966 | Mills . |
| 4,518,446 | 5/1985 | Drennan . |
| 4,702,056 | 10/1987 | Carey . |
| 4,719,735 | 1/1988 | Fleming, Jr. et al. . |
| 4,813,990 | 3/1989 | Thorn . |
| 4,843,772 | 7/1989 | Lisa et al. . |
| 4,890,438 | 1/1990 | Tosa et al. ............ 52/790 |
| 5,038,542 | 8/1991 | Fline ............ 52/306 |
| 5,079,886 | 1/1992 | Downs ............ 52/307 |

FOREIGN PATENT DOCUMENTS 968117   5/1975   Canada .

*Primary Examiner*—Michael Safavi
*Attorney, Agent, or Firm*—Crutsinger & Booth

[57] ABSTRACT

A translucent panel is provided to simulate the surface of a glass-block matrix. The panel is impressed with a rectangular grid to simulate the perimeter of a plurality of glass blocks in a matrix and with a texture pattern simulating the pattern or texture of glass blocks. Two panels are mounted in a window frame in a spaced parallel configuration to simulate a glass-block window. An interior partition or wall is constructed with panels on either side of an interior framework. The partition is finished by suitable end caps, corner pieces and top caps. The translucent panel is preferably made by feeding a hot sheet of glass or plastic between two opposed rollers each having a suitable pattern thereon.

18 Claims, 3 Drawing Sheets

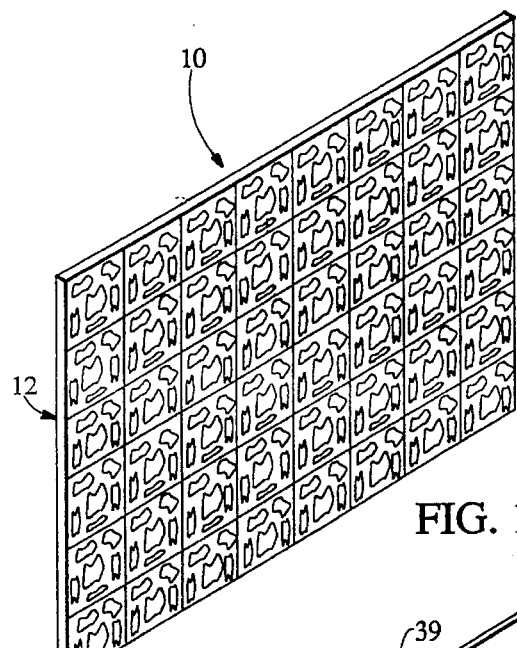
FIG. 1
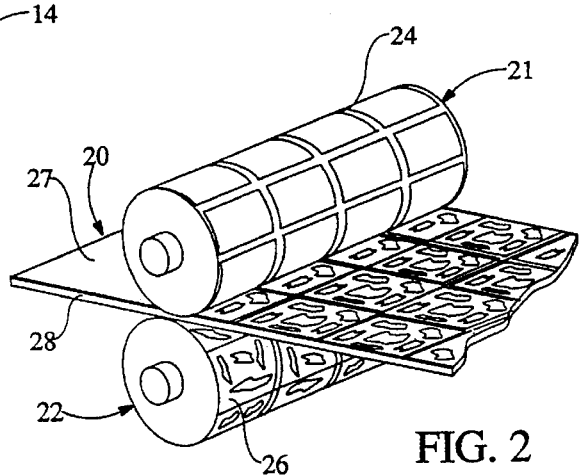
FIG. 2
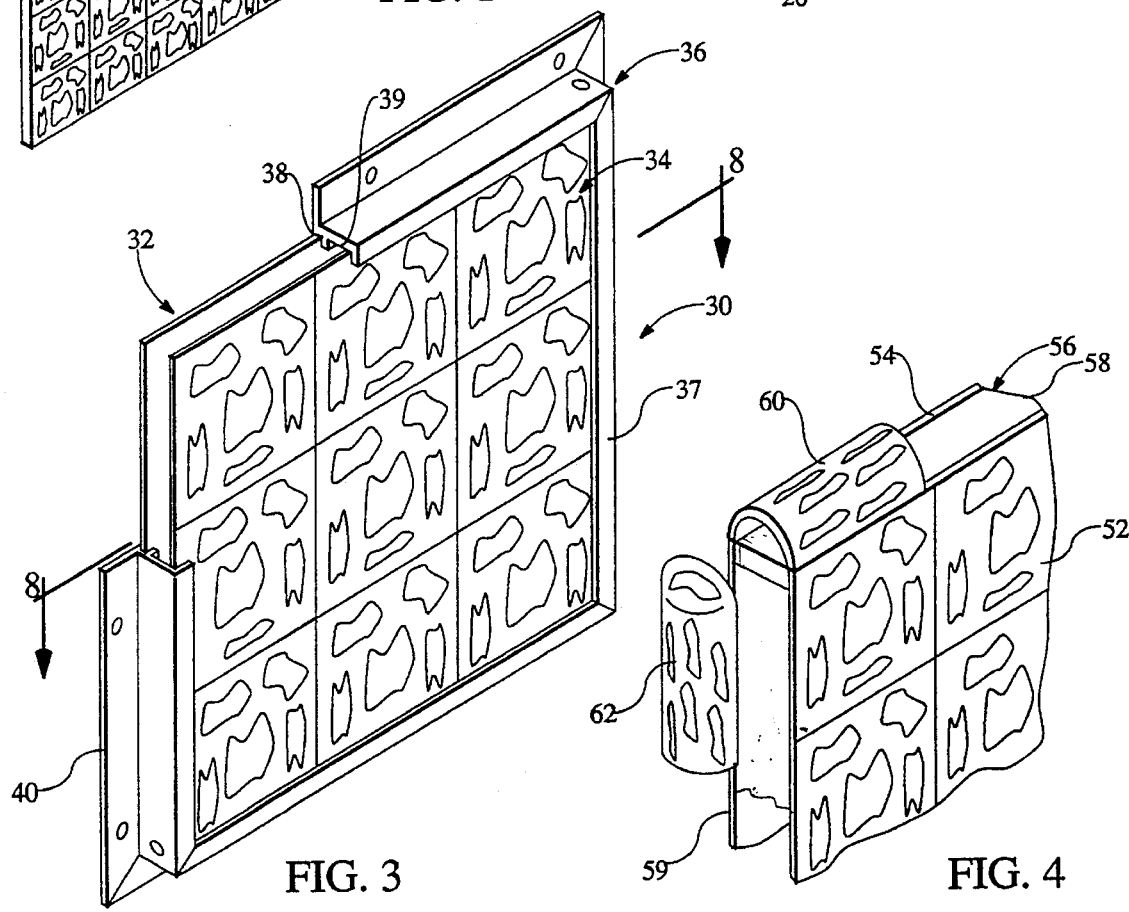
FIG. 3
FIG. 4

SIMULATED GLASS-BLOCK STRUCTURE

BACKGROUND OF THE INVENTION

This invention relates generally to building panel structures and more specifically relates to a prefabricated window or partition unit resembling or simulating glass-block structures.

Conventional methods for building glass-block windows, panels or partitions typically required the installation of a plurality of hollow glass cubes, called glass blocks, in a matrix arrangement in a window area or as a freestanding wall or partition. Typically, such construction procedures required a skilled brick mason to lay the blocks in place with mortar, a procedure which was costly and time-consuming. Moreover, costly maintenance and repair of such a glass-block panel was frequently needed as the mortar leaked or crumbled after a few years, resulting in further expense. Moreover, the weight of such a glass panel structure often required additional reinforcement in the underlying structure in order to bear the load.

One alternative to the above procedure was to build the individual glass blocks on site as shown in U.S. Pat. No. 2,173,213, granted to Maul. Each glass block was assembled separately and then connected together by mortar. However, the resulting problems mentioned above were still present.

Another prior art structure provided for window panels resembling glass-block windows composed of a pair of prefabricated panels as shown in U.S. Pat. No. 3,252,260 to Mills. However, this structure required the manufacture of a rather complicated integrally molded panel piece with precisely interconnecting ribs to connect the panels together. The interconnecting ribs also provided thermal connection between inner and outer panels, resulting in undesirable heat transfer between panels.

A grid system has also been provided within which to install individual glass blocks at a construction site which are then sealed with a caulking compound as shown in U.S. Pat. No. 3,180,780, granted to Ritter. This panel grid required precise prefabricated molding and limited the size and shape of the resulting structure.

BRIEF SUMMARY OF THE INVENTION

The present invention provides a prefabricated panel simulating or imitating a glass block matrix that overcomes many of the shortcomings of the prior art devices. The prefabricated panel is made of a transparent or translucent planar material presenting the appearance of a glass-block matrix, including a grid formation similar to that of a plurality of mortared glass block perimeters and a pattern or texture creating the translucent effect of glass blocks. The panel may be constructed by a rolling sheet process, thereby avoiding expensive molding processes. The panel is preferably relatively lightweight and can be assembled in a window frame unit that is easily installed in a conventional rough opening in a wall on site. Window installation is accomplished in the same manner as any normal window, and glass partition installation is carried out using a simple framing structure. The assembly will preferably be completed prior to shipment to the job site where it will be installed in a rough opening.

The effect of the present invention is to provide a relatively inexpensive panel for use in a wall, skylight, window or shower to simulate a plurality of glass blocks without the resulting weight or cost inherent in glass block partitions, panels or windows. Thus, the present invention eliminates the need for a plurality of glass blocks and for the substantial labor expenses for installation and repair and for additional supporting structure to bear the weight of a glass-block structure. The panel of the present invention provides an inexpensive, relatively lightweight structure simulating a matrix of glass blocks without the accompanying manufacturing and installation requirements, weight, cost and time delays.

BRIEF DESCRIPTION OF THE DRAWINGS

The various advantages and features of the present inventions will be apparent from a consideration of the drawings in which:

FIG. 1 is a perspective view of a preferred embodiment of the invention showing a glass panel configured to resemble or imitate a glass-block matrix;

FIG. 2 is a perspective view of a preferred process of the present invention for manufacturing the panel of FIG. 1;

FIG. 3 is a perspective partially cut-away view showing the panel of the present invention in a window frame assembly;

FIG. 4 is a perspective partial cut-away view of a corner of a partition utilizing the panel of the present invention;

Figure 5:
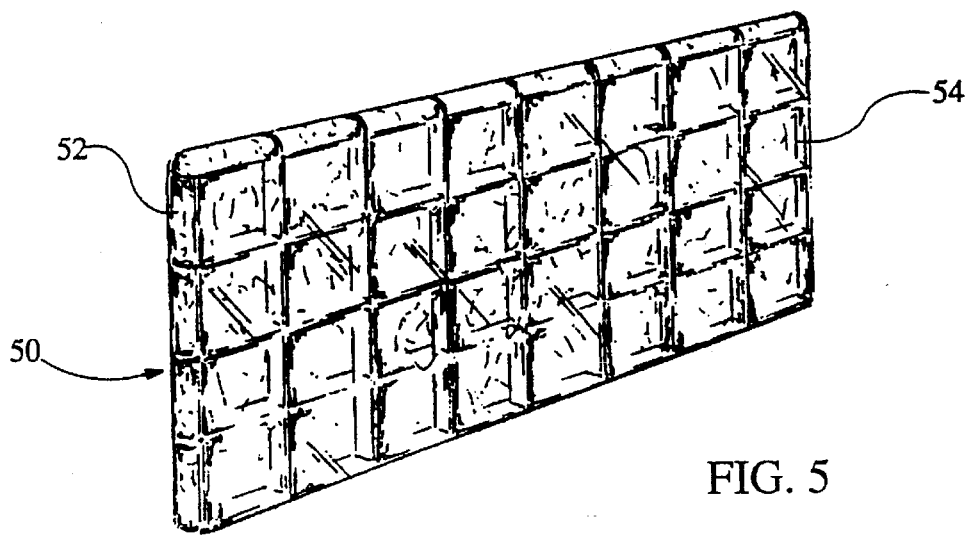
FIG. 5 is a perspective view of a wall utilizing panels in accordance with the present invention.

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples.

DETAILED DESCRIPTION OF THE PREFERRED EMBODIMENTS

Turning now to a description of the drawings in which several embodiments of the present invention are shown, the numeral 10 generally designates a prefabricated panel constructed according to the present invention. Referring to FIG. 1, panel 10 is preferably a single sheet of transparent or translucent material such as glass or plastic which has been worked to have a wavy or other uneven or patterned inner surface 14 and a generally smooth outer surface 16 to transmit and diffuse light so that objects beyond the panel cannot be seen clearly thereby simulating the effect of a glass-block structure. It should be noted that the term wavy is intended to mean any surface that results in a variation of the thickness of the sheet to diffuse and or refract light.

The panel includes a plurality of channel-shaped impressions in a rectangular grid pattern 12 imprinted on the generally smooth outer surface 16 to resemble the perimeters of a plurality of glass blocks which have been connected together with mortar. The combined effect of the wavy inner surface 14 and the generally smooth outer surface 16, together with the rectangular grid pattern 12, is to create a panel of discrete translucent rectangular shaped regions with dense opaque perimeters simulating a mortared glass block structure.

Figure 8:
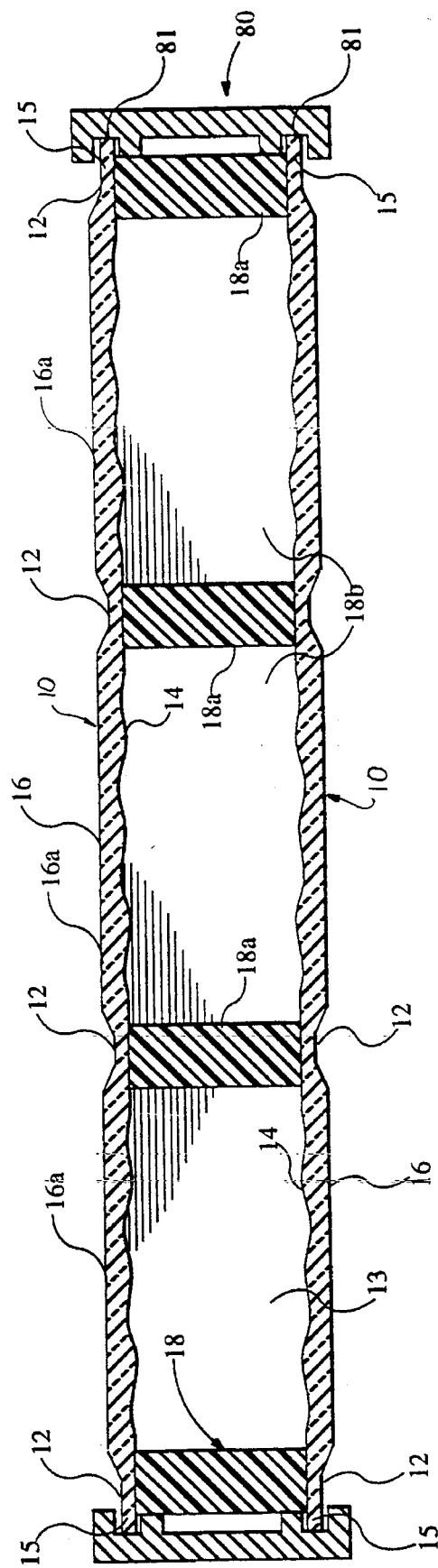
FIG. 8 is cross-sectional view of a translucent panel including a frame and spacing structure in accordance with the present invention.

Panel 10 is preferably manufactured in a process shown in FIG. 2 in which glass or plastic sheeting 20 having a first flat surface 27 on one side and a second flat surface 28 on the other side is passed between two opposing rollers 21 and 22 moving in opposite directions. Preferably, roller 21 includes a rectangular matrix of raised ribs 24 which form a plurality of channel-shaped impressions in a grid-like pattern on first flat surface 27 of sheeting 20. Roller 22 preferably includes a texture or relief pattern 26 over the entire surface of the roller which is impressed on the second flat surface 28 of the glass sheeting to form a texture pattern on panel 20, as shown in FIG. 8. The glass or plastic panel 20 is preferably heated before or during this process to facilitate impressing the patterns of rollers 21 and 22 thereon.

As an alternative embodiment, rollers 21 or 22 may have different patterns thereon or either one may simply be a smooth roller. For example, roller 21 may be smooth rather than having a grid-like pattern, or roller 22 may be smooth rather than having textured impressions. Using this approach, two sheets may be run separately or simultaneously through rollers so that one sheet 20 is impressed with a grid-like pattern and the other sheet 20 receives a textured pattern. The two sheets together form a panel simulating a matrix of glass blocks.

A prefabricated window structure 30, illustrated in FIG. 3, includes two panels 32 and 34. In the illustrated embodiment, each panel 32, 34 includes a wavy surface on one side and a grid pattern on the other side, in accordance with the panels of the present invention, and peripheral edges. Panels 32, 34 are preferably mounted in a rectangular window frame 36 comprising four separate frame pieces 37, each piece having beveled corners connected together and two separated longitudinal slots 38 and 39 running along the interior surface of frame piece members 37 for receiving and supporting the peripheral edges of panels 32 and 34. A flange member 40 extends in a generally perpendicular direction from the outer surface of each member 37 to form a nailing flange for the window member 30.

It is to be understood that frame 36 may have different spaced slots to position panels 32 and 34 at different widths from each other, depending on the application. Thus, for a double pane window use, the frame slots 38 and 39 may position the panels substantially flush. Moreover, an alternate framework may have only one groove for supporting one panel in certain applications.

Preferably, the space between panels 32 and 34 is a void. However, various materials may be inserted therein, including insulation or a spacing structure having a grid pattern corresponding to the perimeters of the simulated glass blocks for enhancing the appearance of a matrix of glass blocks. Interior lighting may also be placed therein for accentuation of the glass wall effect.

In another embodiment of the present invention, a partition structure 50 is provided. Partition structure 50 can be used as an interior glass wall, divider, or other such structure. As best illustrated in FIGS. 4 and 5, partition structure 50 preferably includes two spaced-apart panels 52 and 54 of the type shown in FIG. 1, each being supported by a framework 56 preferably positioned and enclosed entirely between panels 52 and 54. The framework 56 includes horizontal beam members 58 and vertical column members 59 which may be constructed of wood, metal or other suitable building material. Framing structure 56 is preferably built as a free-standing structure to which the simulated glass block panels 52 and 54 are affixed using an adhesive or other suitable connector means. Partition 50 may include conventional capping pieces such as top cap 60 and end cap 62, preferably made of the same material as panels 52 and 54, to finish off the top and sides of the glass-block partition structure 50.

Figure 6:
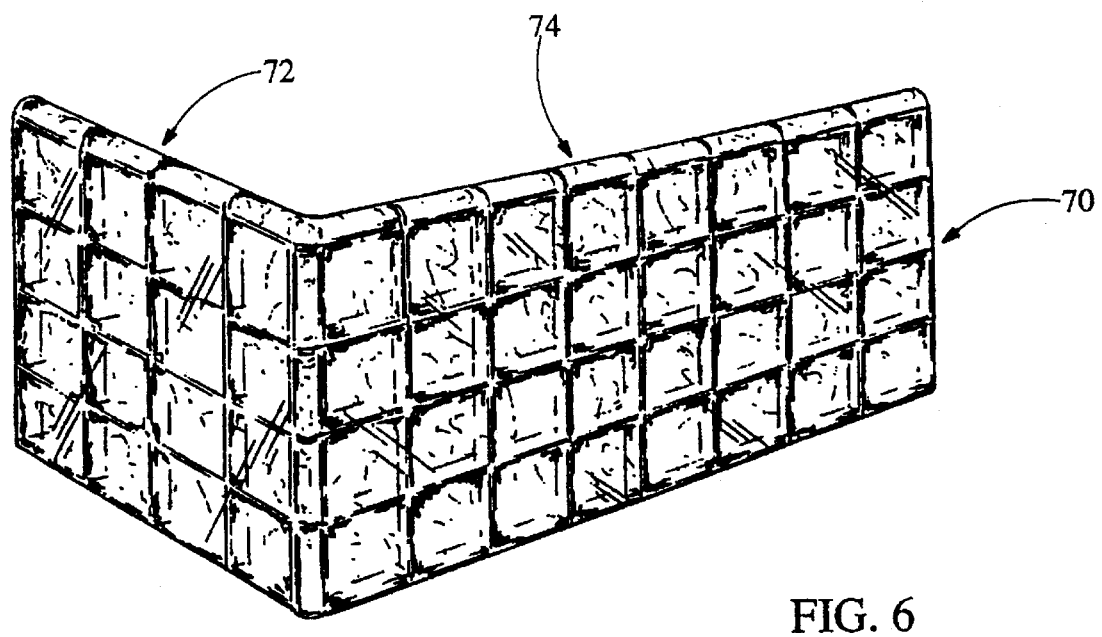
FIG. 6 is a perspective view of an L-shaped partition or wall utilizing panels of the present invention.
Figure 7:
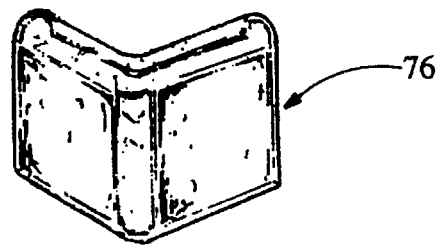
FIG. 7 is a partial cut-away perspective view of a corner piece of the partition shown in FIG. 6.

A variation of the partition structure of FIG. 5 is illustrated in FIG. 6. Referring the FIG. 6, the numeral 70 designates an "L"-shaped wall structure which includes two walls 72 and 74 joined together to form an "L". Walls 72 and 74 are formed in the same manner as shown in FIG. 4. A corner piece 76 is provided which caps the exposed edges of the panels 52 and 54. In a similar manner to top cap member 60 and side cap member 62, corner piece 76 is preferably fabricated from the same material as panels 52 and 54.

In yet another embodiment of the present invention illustrated in FIG. 8, frame 80 is provided which includes spaced grooves 81 for supporting first and second sheets 10 in a spaced relationship. Each sheet 10 is provided with an outer edge 15 extending into respective grooves 81. It should be readily apparent that either one or both sheets 10 may have a wavy inner surface 14 and generally smooth outer surface 16. In addition, either one or both sheets 10 may have outer surface 16 impressed with channel-shaped impressions in a grid pattern 12 defining an array of planar areas 16a. Preferably the channel-shaped impressions are approximately ¼ inch deep and ½ inch wide and are spaced so that the generally planar areas 16a are squares and have a width that varies from 4 to 12 inches.

The wavy pattern on inner surface 14 creates a sheet 10 with a varying cross-section with a sheet thickness in planar areas 16a varying from about ⅛ inch to about ½ inch. In the illustrated embodiment, both sheets 10 have a wavy inner surface 14 and a smooth outer surface 16 imprinted with grid pattern 12.

FIG. 8 further illustrates a spacer structure 18 interposed between sheets 10. Spacer structure 18 comprises a plurality of vertically and horizontally spacer members 18a, 18b, each member 18a, 18b having a depth approximately equal to the distance between sheets 10. Spacers 18a, 18b form a grid substantially conforming to the shape and orientation of channel-shaped impressions forming the grid pattern 12 in sheets 10 and are positioned between the inner surfaces 14 of sheets 10. It can be appreciated that space 13 between sheets 10 in the illustrated embodiment varies depending on depth of the structural members 58 and 59. Preferably space 13 ranges from approximately ¼ inch to six (6) inches.

As stated above, spacer structure 18 is positioned so that spacer members 18a, 18b align with grid pattern 12. Aligning the spacer structure 18 with the grid pattern 12 enhances the mortar effect of an assembled glass-block structure.

It is contemplated that the sheet 20 may be formed by other processes such as molding, casting or forming. Further, it may be formed of any transparent or translucent material that diffuses light so that objects cannot be seen clearly through the material.

While certain novel features of this invention have been shown and described and are pointed out in the annexed claims, it is to be understood that various omissions, substitutions and changes in the form, size and details of the product illustrated herein and its manufacturing process can be made by those skilled in the art without departing from the spirit of the invention.

What is claimed is:

1. A translucent panel having the appearance of a panel formed by glass blocks having borders joined to form a matrix comprising:

a generally flat sheet of translucent material of substantially uniform thickness, said sheet having peripheral edges, each side of said sheet having a generally planar surface extending between said peripheral edges of said sheet, a grid pattern impressed in at least one of said generally planar surfaces of said sheet, a texture pattern impressed in at least one of said generally planar surfaces of said sheet, said grid pattern comprising a first plurality of parallel, spaced-apart linear grooves and a second plurality of parallel, spaced-apart linear grooves at right angles and intersecting the first plurality of grooves so that the first and second plurality of grooves together form a rectangular matrix impressed in the surface of said generally flat sheet to simulate borders of each of a plurality of glass blocks in a matrix of glass blocks, said texture pattern comprising a wavy pattern causing light to refract and to simulate the appearance of translucent surfaces on glass blocks; and frame means to support said peripheral edges of said sheet.

2. The translucent panel of claim 1, wherein the translucent material is glass.

3. The translucent panel of claim 1, wherein the translucent material is plastic.

4. The translucent panel of claim 1, said frame means to support said peripheral edges of said sheet having a pair of slots, said peripheral edges of said sheet extending into said slots.

5. The translucent panel of claim 1, wherein said frame means to support said peripheral edges of said sheet provides a framework for a wall structure and further comprises an adhesive interposed between said framework and said peripheral edges of said sheet.

6. The translucent panel of claim 5, said frame means having a top and at least one side and further comprising:

top cap and end cap pieces for enclosing the top and sides of said frame means.

7. The translucent panel of claim 5, wherein the spacing of the first and second plurality of grooves is such that the surfaces of each of the simulated glass blocks is substantially square.

8. A translucent panel having the appearance of a panel formed by glass blocks having borders joined to form a matrix comprising:

a generally flat sheet of translucent material of substantially uniform thickness, said sheet having peripheral edges, each side of said sheet having a generally planar surface extending between said peripheral edges of said sheet; a grid pattern impressed in at least one surface of said sheet; and a texture pattern impressed in at least one surface of said sheet, said grid pattern comprising a first plurality of parallel, spaced-apart linear grooves and a second plurality of parallel, spaced-apart linear grooves at right angles and intersecting the first plurality of grooves so that the first and second grooves together form a rectangular matrix impressed in said at least one surface of said generally flat sheet to simulate borders of each of a plurality of glass blocks in a matrix of glass blocks, said texture pattern comprising a wavy pattern causing light to refract and to simulate the appearance of translucent surfaces on glass blocks;

frame means to support said peripheral edges of said sheet; and a second generally flat sheet of substantially uniform thickness, said second sheet having peripheral edges, each side of said second sheet having a generally planar surface extending between said peripheral edges of said second sheet, and said peripheral edges of said second sheet supported in said frame means in a spaced relationship from said first sheet defining a continuous passage extending therebetween from one peripheral edge of said panel to another peripheral edge of said panel, said passage for receiving an insertable spacer structure.

9. A prefabricated window structure comprising:

(A) first and second window panels having distal ends, said window panels each being composed of a single generally flat sheet of material of substantially uniform thickness, (a) said first window panel having a grid pattern impressed in a surface of the first panel and (b) said second window panel having a texture pattern impressed in a surface of the second window panel to simulate a plurality of glass blocks laid adjacent to each other in a matrix construction, (i) said grid pattern comprising a first plurality of parallel, spaced-apart linear grooves and a second plurality of parallel, spaced-apart linear grooves at right angles and intersecting the first plurality of grooves so that the first and second grooves together form a rectangular matrix impressed in the surface of the panel to simulate borders of each of a plurality of glass blocks in a matrix of glass blocks, and (ii) the texture pattern comprising a pattern simulating the appearance of a translucent surface of glass blocks;

(B) a window frame having first and second support means positioning said first and second panels in parallel spaced-apart position relative to each other to simulate a matrix of glass blocks and to define a continuous passage extending therebetween from one distal end of said panels to another distal end of said panels; and (C) a means for attaching said frame to a building structure.

10. The structure of claim 9, wherein each said first and second window panel has the grid pattern in the surface of one side and the texture pattern in the surface of the other side to simulate a matrix of a plurality of glass blocks.

11. The structure of claim 9, wherein said first and second window panels are enclosed within said window frame.

12. A panel comprising:

a frame having grooves;

first and second generally flat sheets of substantially uniform thickness, said sheets having outer edges and inner and outer surfaces, said outer edges of said first and second sheets extending into said grooves, each of said sheets having an array of channels formed in said outer surfaces, said channels forming a grid pattern and defining a matrix of generally rectangular shaped planar areas on said outer surfaces, at least one of said sheets having a wavy inner surface such that the thickness of at least one sheet varies throughout said matrix of generally rectangular shaped areas between said channels, said frame supporting said first and second sheets in a spaced apart relationship such that said outer surfaces and said wavy inner surface transmit and diffuse light so that objects beyond the panel cannot be seen clearly; and an insertable spacer structure having a plurality of horizontal and vertical members forming a grid, said grid substantially conforming to the shape and orientation of said channels, said spacer structure being positioned between said inner surfaces of said first and second sheets.

13. A panel according to claim 12, the thickness of said sheet in said generally rectangular shaped areas varying in a range between about ⅛ inch and about ½ inch.

14. A panel according to claim 12, each of said sheets having a thickness of approximately ½ inch adjacent said channels, each of said channels extending into said sheet a distance of about ¼ inch, each of said grooves being about ½ inch wide and spaced such that said generally rectangular shaped planar areas are squares having a width in a range between about 4 and 12 inches.

15. A panel according to claim 12, said first and second sheets being formed of glass.

16. A panel according to claim 12, said first and second translucent sheets being formed of plastic material.

17. A panel according to claim 12, said frame being configured such that said first and second sheets are spaced apart from each other a distance in a range between a ¼ inch and six inches.

18. A prefabricated window structure comprising:
   (A) first and second window panels, said window panels each being composed of a generally flat sheet of material of substantially uniform thickness,
      (a) said first window panel having a grid pattern impressed in a surface of said first panel,
         (i) said grid pattern comprising a first plurality of parallel, spaced-apart linear grooves and a second plurality of parallel, spaced-apart linear grooves at right angles and intersecting the first plurality of grooves so that the first and second plurality of grooves together form a rectangular matrix impressed in the surface of the panel to simulate borders of each of a plurality of glass blocks in a matrix of glass blocks, and
      (b) said second window panel having a texture pattern impressed in a surface of said second window panel to simulate a plurality of glass blocks laid adjacent to each other in a matrix construction,
         (i) said texture pattern comprising a pattern simulating the appearance of a translucent surfaces on glass blocks;
   (B) a window frame having first and second support means positioning said first and second panels in parallel spaced-apart position relative to each other to simulate a matrix of glass blocks;
   (C) a means for attaching said window frame to a building structure; and
   (D) an insertable spacer structure having a plurality of horizontal and vertical members forming a grid, said spacer structure being positioned between said first and second window panels and coinciding with said linear grooves forming said grid pattern on the panels.

* * * * *

REEXAMINATION CERTIFICATE (3655th)

United States Patent [19]

Dorough, Jr.

[11] B1 5,622,019

[45] Certificate Issued Oct. 27, 1998

[54] SIMULATED GLASS-BLOCK STRUCTURE

[76] Inventor: Joe Dorough, Jr., 2719 Royal La., #401, Irving, Tex. 75063

Reexamination Request:
No. 90/004,763, Sep. 29, 1997

Reexamination Certificate for:
Patent No.: 5,622,019
Issued: Apr. 22, 1997
Appl. No.: 203,432
Filed: Mar. 1, 1994

[51] Int. Cl.$^6$ .................... E04C 2/36; E04C 2/54
[52] U.S. Cl. .................... 52/308; 52/314; 52/316; 52/456; 52/793.11; 52/800.14

[56] References Cited

U.S. PATENT DOCUMENTS

| | | |
|---|---|---|
| 21,896 | 10/1858 | Miles . |
| D. 34,843 | 7/1901 | Walsh, Jr. . |
| D. 336,961 | 6/1993 | Carlson et al. . |
| 370,176 | 9/1887 | Brogan et al. . |
| 370,178 | 9/1887 | Brogan et al. . |
| 599,716 | 3/1898 | Lutwyche . |
| 720,138 | 2/1903 | Hartung . |
| 720,139 | 2/1903 | Hartung . |
| 737,707 | 9/1903 | Chanoe . |
| 1,528,194 | 3/1925 | Burgess . |
| 1,920,503 | 8/1933 | Hadley . |
| 2,108,811 | 2/1938 | Fisher . |
| 2,111,569 | 3/1938 | Mulford . |
| 2,145,930 | 2/1939 | Herron . |
| 2,168,287 | 8/1939 | Favaron . |
| 2,173,213 | 9/1939 | Maul . |
| 2,187,329 | 1/1940 | Roney et al. . |
| 2,242,872 | 5/1941 | Rolph . |
| 2,812,691 | 11/1957 | Boyd . |
| 2,863,534 | 12/1958 | Gillespie . |
| 2,931,468 | 4/1960 | Keller . |
| 2,981,382 | 4/1961 | Keller . |
| 3,180,780 | 4/1965 | Ritter . |
| 3,183,140 | 5/1965 | Gibson . |
| 3,238,031 | 3/1966 | Nikoll . |
| 3,238,679 | 3/1966 | Capoccia . |
| 3,252,260 | 5/1966 | Mills . |
| 3,308,593 | 3/1967 | Smith . |
| 3,946,531 | 3/1976 | Armstrong . |
| 4,109,432 | 8/1978 | Pilz . |
| 4,164,598 | 8/1979 | Wilhelm . |
| 4,518,446 | 5/1985 | Drennan . |
| 4,702,056 | 10/1987 | Carey . |
| 4,719,735 | 1/1988 | Fleming, Jr. et al. . |
| 4,783,938 | 11/1988 | Palmer . |
| 4,813,990 | 3/1989 | Thorn . |
| 4,843,772 | 7/1989 | Lisa et al. . |
| 4,890,438 | 1/1990 | Tosa et al. . |
| 4,891,925 | 1/1990 | Carlson et al. . |
| 4,989,384 | 2/1991 | Kinghorn et al. . |
| 5,038,542 | 8/1991 | Kline . |
| 5,061,531 | 10/1991 | Catalano . |
| 5,079,886 | 1/1992 | Downs . |
| 5,687,421 | 11/1997 | Carlson et al. . |

FOREIGN PATENT DOCUMENTS 968117  5/1975  Canada .

OTHER PUBLICATIONS

Hy–Lite® Block Windows brochure, Copyright 1997.

*Primary Examiner*—Michael Safavi

[57] ABSTRACT

A translucent panel is provided to simulate the surface of a glass-block matrix. The panel is impressed with a rectangular grid to simulate the perimeter of a plurality of glass blocks in a matrix and with a texture pattern simulating the pattern or texture of glass blocks. Two panels are mounted in a window frame in a spaced parallel configuration to simulate a glass-block window. An interior partition or wall is constructed with panels on either side of an interior framework. The partition is finished by suitable end caps, corner pieces and top caps. The translucent panel is preferably made by feeding a hot sheet of glass or plastic between two opposed rollers each having a suitable pattern thereon.

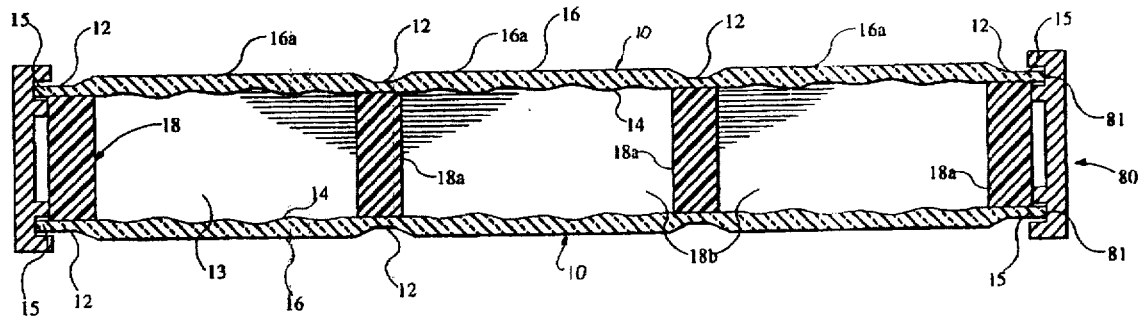

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–18 is confirmed.

New claims 19–27 are added and determined to be patentable.

*19. A translucent panel having the appearance of a panel formed by glass blocks having borders joined to form a matrix comprising:*

*a generally flat sheet of translucent material of substantially uniform thickness, said sheet having peripheral edges, each side of said sheet having a generally planar surface extending between said peripheral edges of said sheet, a grid pattern impressed in at least one of said generally planar surfaces of said sheet, a texture pattern impressed in at least one of said generally planar surfaces of said sheet, said grid pattern comprising a first plurality of parallel, spaced-apart linear grooves and a second plurality of parallel spaced-apart linear grooves at right angles and intersecting the first plurality of grooves so that the first and second plurality of grooves together form a matrix of generally rectangular shaped planar areas impressed in the surface of said generally flat sheet to simulate borders of each of a plurality of glass blocks in a matrix of glass blocks, said texture pattern comprising a wavy pattern causing light to refract and to simulate the appearance of translucent surfaces on glass blocks, said grooves being spaced such that said generally rectangular shaped planar areas are squares having a width in a range of between about 4 and 12 inches; and*

*frame means to support said peripheral edges of said sheet.*

*20. The translucent panel of claim 19, wherein the translucent material is glass.*

*21. The translucent panel of claim 19, wherein the translucent material is plastic.*

*22. The translucent panel of claim 19, said frame means to support said peripheral edges of said sheet having a pair of slots said peripheral edges of said sheet extending into said slots.*

*23. The translucent panel of claim 19, wherein said frame means to support said peripheral edges of said sheet provides a framework for a wall structure and further comprises an adhesive interposed between said framework and said peripheral edges of said sheet.*

*24. The translucent panel of claim 23, said frame means having a top and at least one side and further comprising:*

*top cap and end cap pieces for enclosing the top and sides of said frame means.*

*25. The translucent panel of claim 23, wherein the spacing of the first and second plurality of grooves is such that the surfaces of each of the simulated glass blocks is substantially square.*

*26. A panel according to claim 19, wherein the thickness of said sheet in said generally rectangular shaped areas is in a range between about ⅛ inch and about ½ inch.*

*27. A panel according to claim 19, said sheet having a thickness of approximately ½ inch adjacent said grooves, each of said grooves extending into said sheet a distance of about ¼ inch, each of said grooves being about ½ inch wide.*

* * * * *